Jan. 17, 1939.  D. R. BATES  2,144,559
WIND DRIVE ELECTRIC MACHINE
Filed May 5, 1938  2 Sheets-Sheet 2
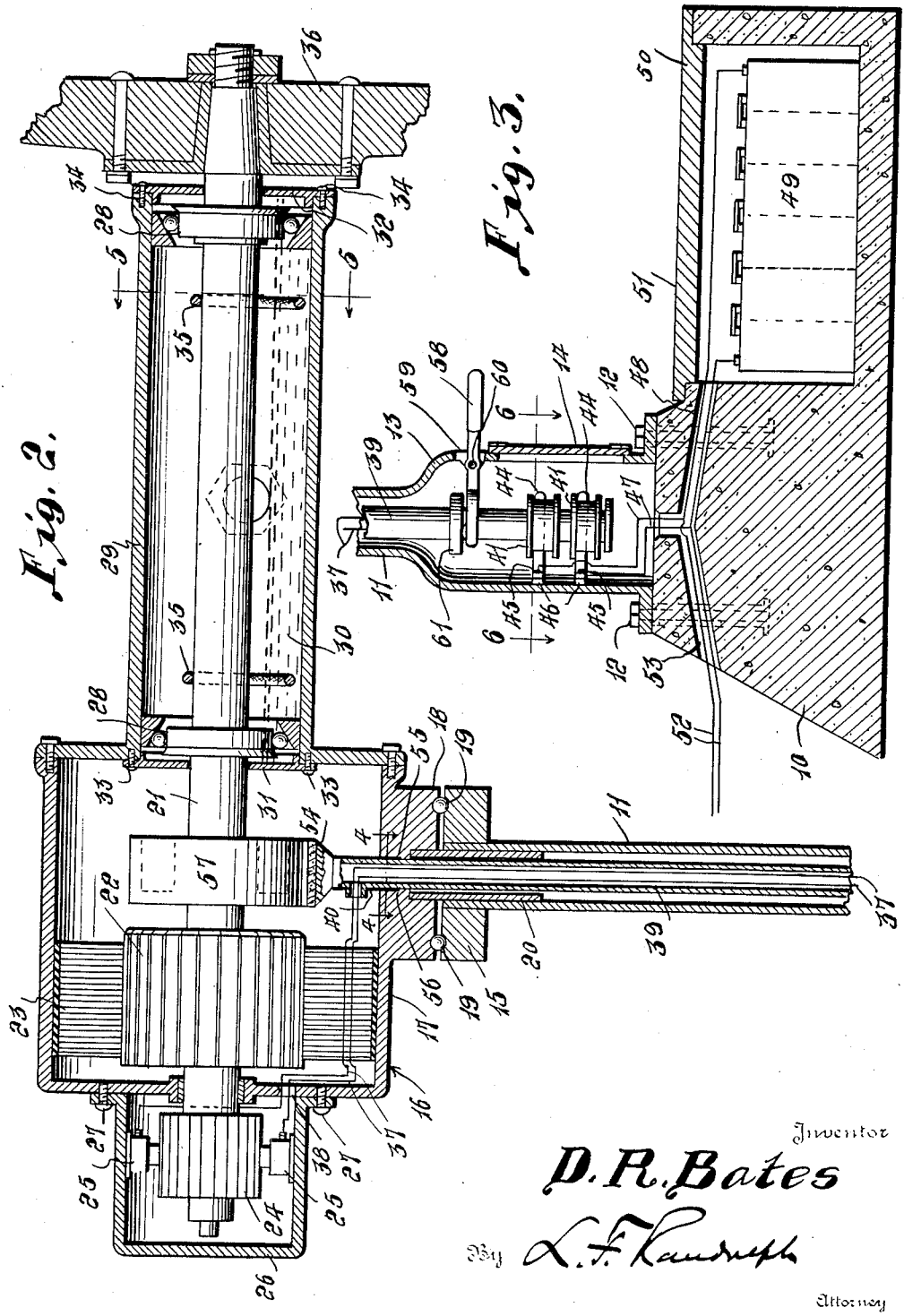
Inventor
D. R. Bates
By L. F. Landreth
Attorney Patented Jan. 17, 1939

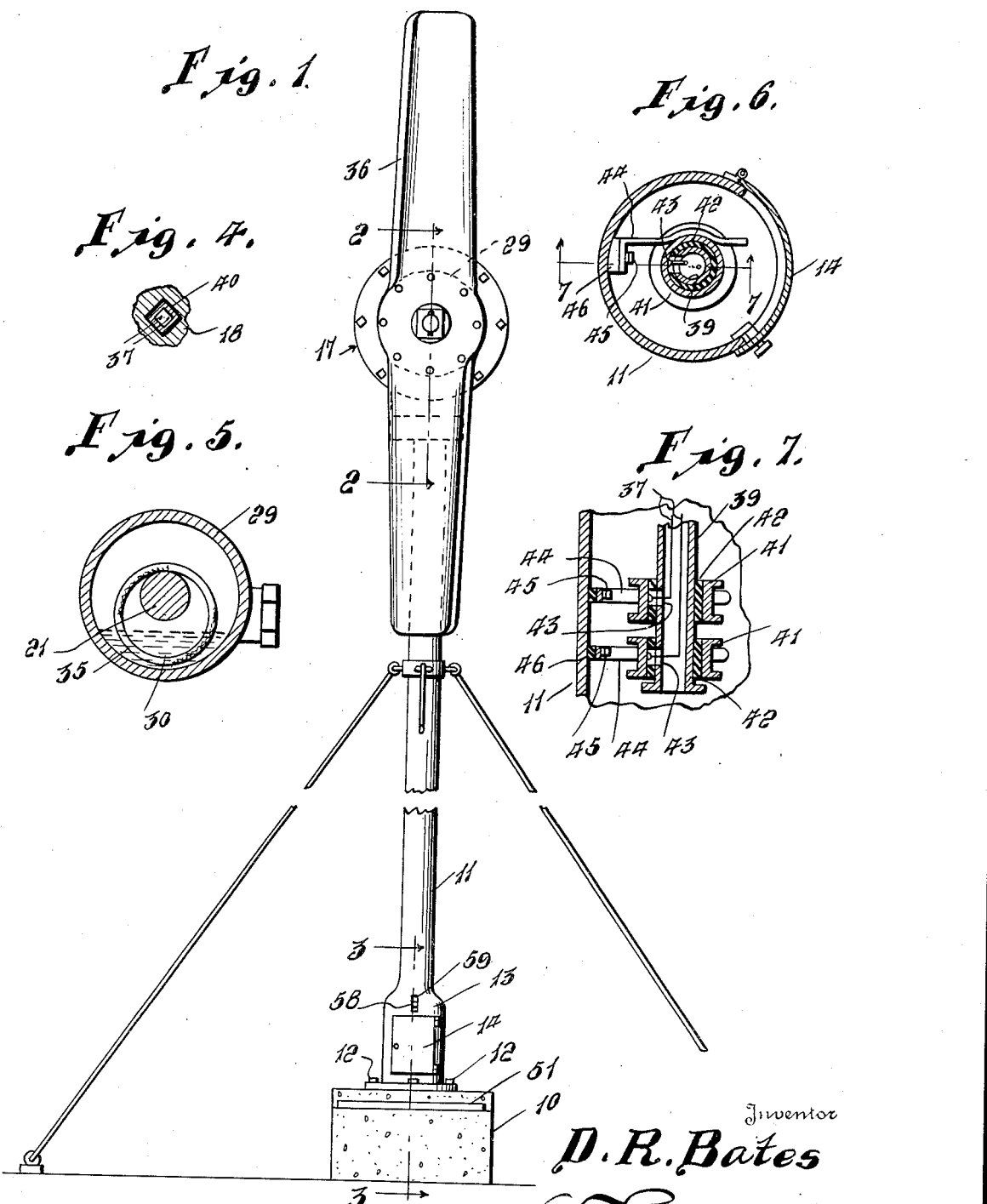

2,144,559

UNITED STATES PATENT OFFICE 2,144,559

WIND DRIVE ELECTRIC MACHINE

David R. Bates, Franklin, Mo.

Application May 5, 1938, Serial No. 206,251

4 Claims. (Cl. 290—44)

This invention relates to an electric machine or dynamo mechanism adapted to be operated by the wind.

A particular object is to provide a novel structure which is exceedingly durable so that it will prove efficient in use and have long life.

Another object is to provide a novel structure having a hollow brake element which functions also as a guide for conductors.

In addition, it is aimed to provide a novel structure which is balanced, is operable by an aeroplane type of propeller and has a novel foundation, preferably of concrete, serving as a housing for storage batteries and also as a mounting for the operating parts.

The more specific objects and advantages will become apparent from a consideration of the description following taken in connection with accompanying drawings illustrating an operative embodiment.

In said drawings:—

Figure 1 is a view in elevation showing my improvements;

Figure 2 is a view in substantially central vertical section of the upper part of the device;

Figure 3 is a substantially central vertical sectional view of the lower part of the device;

Figure 4 is a detail cross section taken on the line 4—4 of Figure 2;

Figure 5 is a detail cross section taken on the line 5—5 of Figure 2;

Figure 6 is a detail cross section taken on the line 6—6 of Figure 3, and

Figure 7 is a detail cross section taken on the line 7—7 of Figure 6.

Referring specifically to the drawings wherein like reference characters designate like or similar parts, 10 designates a foundation of concrete to which a hollow column 11 is bolted as at 12, such column being enlarged adjacent its base at 13 and provided with a door 14, enabling access to the interior for inspection and repair of parts therein. Said column at its top carries a turntable or bearing plate 15.

Above the column is a dynamo structure 16 including a casing 17 having a turntable or bearing plate 18 fastened thereto which is disposed on the turntable or bearing plate 15, with ball bearings 19, preferably interposed. Fixed to the turntable 18 is a sleeve or bearing tube 20, which depends rotatably into the upper end of the column 11.

Disposed at a right angle to the column and journaled in the casing 16 is a shaft 21 having an armature 22 thereon co-acting with field pole pieces 23, carried by the casing 17. Attention is called to the fact that the field pole pieces 23 are much longer than the usual type for the purpose of carrying a large number of turns of wire in a shunt field circuit since many turns and low amperage in the field circuit gives the desired ampere turns with low current use for magnetizing effect. One end of the shaft 21 carries a commutator 24 with which the usual brushes 25 are associated. A protecting cover or hood 26 houses the commutator 24, and carries the brushes 25 and their holders, such hood being fastened as at 27 to one end of the dynamo casing 17.

Shaft 21 is primarily mounted in suitable ball bearing cages 28 housed adjacent opposite ends of a tubular housing 29 forming an extension of the casing 17. Said housing 29 is adapted to contain lubricant 30, to the level shown, and at opposite ends thereof, lubricant retainer members 31 and 32, are fastened as by means of screws 33 and 34, respectively. Oil rings 35, loosely surround the shaft 21 and dip within the oil of the housing 29, so as to transfer the same to the shaft 21 and its bearings during motion.

One end of the shaft 21 extends beyond the free end of housing 29 and mounted thereon is a propeller 36, preferably of the aeroplane type, adapted to be driven by the wind. Conductor wires 37 extend from the brushes 25 through an opening 38 into the housing 17 and thence into a tubular element 39 rotatable with the housing 17 and preferably having a relatively loose square fit therewith as at 40.

Said tubular element 39 adjacent the lower end, has two spool like conductor members 41 fastened thereto but insulated therefrom as at 42. Said conductors 37 extend through openings 43 in the tubular member 39 and one is connected to each of the spool conductors 41.

Contact fingers 44 are fastened at 45 to the enlargement 13 of the column 11, interiorly thereof, and insulated therefrom as at 46. From the fastenings 45, conductors 47 lead, which extend through a passage 48 in the base 10, and are electrically connected to storage batteries 49, contained within a case or well 50, provided in the concrete foundation 10 and which preferably has a removable or displaceable cover at 51. Power take-off wires 52 are suitably connected to the batteries 49 and pass through the passage 48 and another passage 53 in the base 10.

Particular attention is called to the dual function of the hollow member 39 since it functions as a conduit and housing for the conductors and it also functions as a brake member, having a brake head or enlargement 54 at its upper end. Such element 39 is vertically slidable, having an enlargement as at 55 which rests on a shoulder 56 within the turntable member 18, to limit the lowering movement of such member 39. On the shaft 21 is a drum 57, with which the brake head or shoe 54 co-acts and from which it is normally spaced.

In order to lift the element 39 to function as a brake, so that the head 54 will engage the drum 57 to stop operation of the shaft 21, a lever 58 is pivoted to the casing enlargement 13 in an opening 59 as at 60, the lever extending below and engaging a collar or flange 61 on the member 39. Depression of the lever 58, in the position of Figure 3, will serve to elevate the member 39 for braking action.

It will be realized that the aeroplane type of blade or propeller 36 trails in the wind with the driving face toward the shaft so that no tail fin is required. It will also be realized that the structure supported on the column 11 is balanced. The rotation of the propeller serves to rotate the shaft 21 and at times the entire dynamo 16 and its connections also turning on the vertical axis of the column 11. The rotation generates electricity, which passes through the wires 37 to the spools 41, and thence to the contacts 44 and conductors 47 to the batteries 49, from which the current may be supplied to any desired source of use as through the wires 52.

Various changes may be resorted to provided they fall within the spirit and scope of the invention.

I claim as my invention:—

1. A wind apparatus of the class described comprising a column, a casing journaled on the column, a dynamo in said casing, said dynamo having a shaft at a right angle to the column, a wind driven propeller on the shaft, commutator means on the shaft, brushes associated with the commutator means, conductors leading from the brushes through the column, said casing having a tubular housing extending therefrom, bearings for the shaft located in said housing, oil retainers at opposite ends of the housing whereby lubricant may be maintained within the housing, and means in the housing operable to supply oil from the supply therein to the shaft.

2. A wind apparatus of the class described comprising a column, a dynamo journaled on the column, said dynamo having a shaft at a right angle to the column, a wind driven propeller on the shaft, commutator means on the shaft, brushes associated with the commutator means, conductors leading from the brushes through the column, a base from which the column rises, said base being of concrete and provided with a well, a storage battery within the well, conductor means in slip connection with the first mentioned conductors leading through the base to said storage battery.

3. A wind apparatus of the class described comprising a column, a casing journaled on the column, a dynamo in said casing, said dynamo having a shaft at a right angle to the column, a wind driven propeller on the shaft, commutator means on the shaft, brushes associated with the commutator means, conductors leading from the brushes through the column, a hollow member within the column extending into the casing, a member being movable for application against the shaft, said conductors extending directly into the hollow member, continuous conductors on the hollow member to which the first mentioned conductors lead, and take-off conductor means within the column in slip connection to the conductors.

4. A wind apparatus of the class described comprising a column, a casing journaled on the column, a dynamo in said casing, said dynamo having a shaft at a right angle to the column, a wind driven propeller on the shaft, commutator means on the shaft, brushes associated with the commutator means, conductors leading from the brushes through the column, a hollow member within the column extending into the casing, a member being movable for application against the shaft, said conductors extending directly into the hollow member, continuous conductors on the hollow member to which the first mentioned conductors lead, take-off conductor means within the column in slip connection to the conductors, a base supporting said column and having a well, a storage battery in the well, conductors leading from the connections through the base to the storage battery, and a turntable structure between the column and said casing.

DAVID R. BATES.